(12) United States Patent
Li et al.

(10) Patent No.: US 10,775,787 B2
(45) Date of Patent: Sep. 15, 2020

(54) INFORMATION SHARING METHOD, APPARATUS, SYSTEM AND DEVICE APPLICABLE TO UNMANNED VEHICLE

(71) Applicant: Baidu Online Network Technology (Beijing) Co., Ltd., Beijing (CN)

(72) Inventors: Gaifan Li, Beijing (CN); Yongyi Sun, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 264 days.

(21) Appl. No.: 15/720,882

(22) Filed: Sep. 29, 2017

(65) Prior Publication Data

US 2018/0231978 A1 Aug. 16, 2018

(30) Foreign Application Priority Data

Feb. 15, 2017 (CN) .......................... 2017 1 0081750

(51) Int. Cl.
| | |
|---|---|
| *G05D 1/00* | (2006.01) |
| *G01C 21/36* | (2006.01) |
| *B60W 30/08* | (2012.01) |
| *G05D 1/02* | (2020.01) |

(52) U.S. Cl.
CPC .......... *G05D 1/0088* (2013.01); *B60W 30/08* (2013.01); *G01C 21/3617* (2013.01); *G05D 1/0027* (2013.01); *G05D 1/0055* (2013.01); *G05D 1/0276* (2013.01); *B60W 2555/60* (2020.02); *G05D 2201/0213* (2013.01)

(58) Field of Classification Search
CPC .. G05D 1/0088; G05D 1/0027; G05D 1/0276; G05D 1/0055; G05D 1/0061; B60W 30/08; B60W 2550/22; G01C 21/3617; H04L 67/12; G08G 1/096725
USPC .......................................................... 701/23
See application file for complete search history.

(56) References Cited

U.S. PATENT DOCUMENTS

| | | | |
|---|---|---|---|
| 9,832,241 B1 * | 11/2017 | Hayward | ............... G01C 21/36 |
| 2018/0004227 A1 * | 1/2018 | Browning | .............. G01C 21/32 |
| 2018/0129204 A1 * | 5/2018 | Ricci | ..................... B60W 40/09 |
| 2018/0239359 A1 * | 8/2018 | Jian | .................... G01C 21/3484 |

FOREIGN PATENT DOCUMENTS

| | | |
|---|---|---|
| CN | 105416259 A | 3/2016 |
| CN | 105489040 A | 4/2016 |

* cited by examiner

*Primary Examiner* — Nadeem Odeh
(74) *Attorney, Agent, or Firm* — Nixon Peabody LLP (57) ABSTRACT

An information sharing method, apparatus and system applicable to an unmanned vehicle and a device. A specific embodiment of the method includes: collecting travel information of an unmanned vehicle, the travel information being configured to indicate a travel state of the unmanned vehicle; determining driving control information adapted to the travel information, and controlling the unmanned vehicle by using the driving control information; and sending the travel information, the driving control information and a safety sign for indicating the unmanned vehicle being in a safe state to a server, in response to determining the unmanned vehicle being in the safe state, to enable the server to push the travel information, the driving control information and the safety sign to an unmanned vehicle in the travel state indicated by the travel information. The present embodiment achieves an improvement of the driving control efficiency of the unmanned vehicle.

20 Claims, 4 Drawing Sheets

INFORMATION SHARING METHOD, APPARATUS, SYSTEM AND DEVICE APPLICABLE TO UNMANNED VEHICLE

CROSS-REFERENCE TO RELATED APPLICATION

This application is related to and claims priority from Chinese Application No. 201710081750.X, filed on Feb. 15, 2017 and entitled "Method, Apparatus and Server for Identifying Risky User", the entire disclosure of which is hereby incorporated by reference.

TECHNICAL FIELD

The present disclosure relates to the field of artificial intelligence, specifically to the field of unmanned vehicles, and more specifically to an information sharing method, apparatus, device and system applicable to an unmanned vehicle.

BACKGROUND

The unmanned vehicle is an intelligent vehicle, also known as the "mobile robot on wheels." It achieves the unmanned driving mainly by relying on a computer system based intelligent pilot in the vehicle. It is important to provide driving solutions quickly to control the unmanned vehicle in different environments to achieve safe driving.

However, there still exists a problem of a low driving control efficiency with regard to the existing method for controlling and driving the unmanned vehicle.

SUMMARY

The objective of the present disclosure is to provide an improved information sharing method, apparatus and system applicable to an unmanned vehicle and a device, in order to solve the technical problem mentioned in the foregoing Background section.

In a first aspect, the present disclosure provides an information sharing method applicable to an unmanned vehicle, comprising: collecting travel information of an unmanned vehicle, the travel information being configured to indicate a travel state of the unmanned vehicle; determining driving control information adapted to the travel information, and controlling the unmanned vehicle by using the driving control information; and sending the travel information, the driving control information and a safety sign for indicating the unmanned vehicle being in a safe state to a server, in response to determining the unmanned vehicle being in the safe state, to enable the server to push the travel information, the driving control information and the safety sign to an unmanned vehicle in the travel state indicated by the travel information.

In a second aspect, the present disclosure provides an information sharing method applicable to an unmanned vehicle, comprising: receiving travel information, driving control information and a safety sign for indicating an unmanned vehicle being in a safe state sent from the unmanned vehicle, the travel information being configured to indicate a travel state of the unmanned vehicle, and the travel information, the driving control information and the safety sign being sent from the unmanned vehicle by collecting the travel information of the unmanned vehicle, determining the driving control information adapted to the travel information, and controlling the unmanned vehicle by utilizing the driving control information, in response to determining the unmanned vehicle being in the safe state; finding an unmanned vehicle in the travel state indicated by the travel information; and pushing the travel information, the driving control information and the safety sign to the found unmanned vehicle.

In a third aspect, the present disclosure provides an information sharing apparatus applicable to an unmanned vehicle, comprising: a collection unit, configured to collect travel information of an unmanned vehicle, the travel information being configured to indicate a travel state of the unmanned vehicle; a determining unit, configured to determine driving control information adapted to the travel information, and control the unmanned vehicle by using the driving control information; and a first sending unit, configured to send the travel information, the driving control information and a safety sign for indicating the unmanned vehicle being in a safe state to a server, in response to determining the unmanned vehicle being in the safe state, to enable the server to push the travel information, the driving control information and the safety sign to an unmanned vehicle in the travel state indicated by the travel information.

In a fourth aspect, the present disclosure provides an information sharing apparatus applicable to an unmanned vehicle, comprising: a first receiving module, configured to receive travel information, driving control information and a safety sign for indicating an unmanned vehicle being in a safe state sent from the unmanned vehicle, the travel information being configured to indicate a travel state of the unmanned vehicle, and the travel information, the driving control information and the safety sign being sent from the unmanned vehicle by collecting the travel information of the unmanned vehicle, determining the driving control information adapted to the travel information, and controlling the unmanned vehicle by utilizing the driving control information, in response to determining the unmanned vehicle being in the safe state; a first finding module, configured to find an unmanned vehicle in the travel state indicated by the travel information; and a first pushing module, configured to push the travel information, the driving control information and the safety sign to the found unmanned vehicle.

In a fifth aspect, the present disclosure provides an information sharing system applicable to an unmanned vehicle, comprising: the apparatus in the third aspect and the apparatus in the fourth aspect.

In a sixth aspect, the present disclosure provides a device, comprising: one or more processors; and a storage configured to store one or more programs, which when executed by the one or more processors, cause the one or more processors to perform the method in the first aspect.

In a seventh aspect, the present disclosure provides a device, comprising: one or more processors; and a storage configured to store one or more programs, which when executed by the one or more processors, cause the one or more processors to perform the method in the second aspect.

In an eighth aspect, the present disclosure provides a computer readable storage medium storing a computer program, which when executed by a processor, causes the processor to perform the method in the first aspect.

In a ninth aspect, the present disclosure provides a computer readable storage medium storing a computer program, which when executed by a processor, causes the processor to perform the method in the second aspect.

The information sharing method, apparatus and system applicable to an unmanned vehicle and a device provided by the present disclosure, by collecting travel information of an unmanned vehicle, determining driving control information adapted to the travel information and controlling the unmanned vehicle by utilizing the driving control information, and sending the travel information, the driving control information and a safety sign for indicating the unmanned vehicle being in a safe state to a server, in response to determining the unmanned vehicle being in the safe state, can achieve an information sharing between unmanned vehicles and improve the driving control efficiency of the unmanned vehicle.

BRIEF DESCRIPTION OF THE DRAWINGS

After reading detailed descriptions of non-limiting embodiments with reference to the following accompanying drawings, other features, objectives and advantages of the present disclosure will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
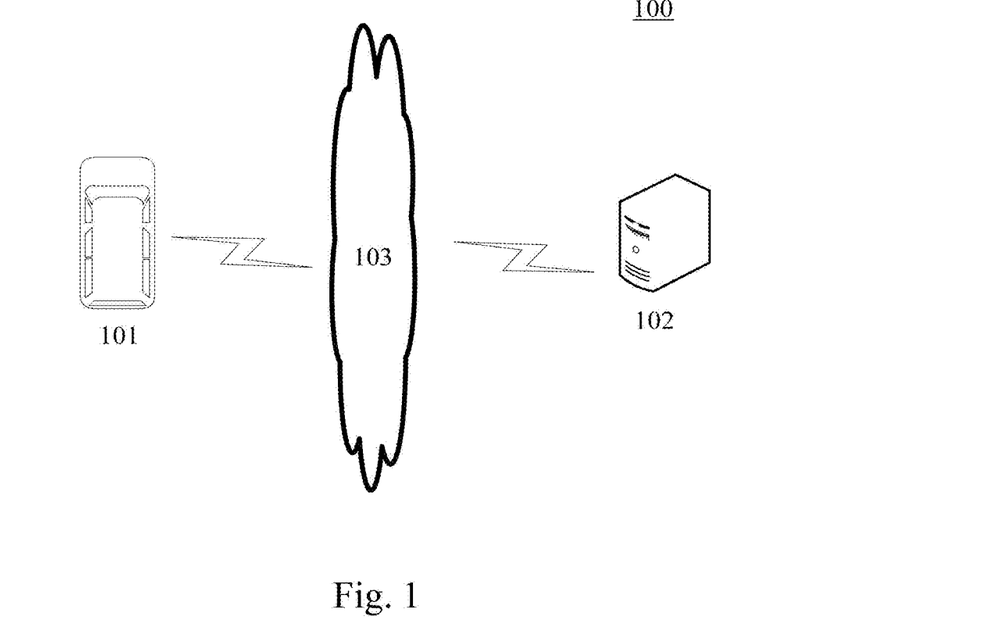
FIG. 1 is an exemplary system architecture diagram in which the present disclosure may be applied.

FIG. 1 illustrates an exemplary system architecture 100 in which an information sharing method applicable to an unmanned vehicle or an information sharing apparatus applicable to an unmanned vehicle in which the present disclosure may be applied.

As shown in FIG. 1, the system architecture 100 may include an unmanned vehicle 101, a network 103 and a server (e.g., a cloud server) 102. The network 103 serves as a medium providing a communication link between the unmanned vehicle 101 and the server 102. The network 103 may be wireless communication links.

The unmanned vehicle 101 may be provided with a sensor deployed inside or outside the vehicle, such as a speed sensor, an angle sensor, a collision sensor, and a bus used for transmitting data of the sensor (e.g., a CAN (Controller Area Network) bus).

The server 102 may be used to store driving control information of different unmanned vehicles. It may receive travel information, driving control information and a safety sign for indicating the unmanned vehicle being in a safe state sent by the unmanned vehicle 101, and push the travel information, the driving control information and the safety sign for indicating the unmanned vehicle being in the safe state to an unmanned vehicle in the travel state indicated by the travel information.

It should be appreciated that the numbers of the unmanned vehicles, the networks and the servers in FIG. 1 are merely illustrative. Any number of unmanned vehicles, networks and servers may be provided based on the actual requirements.

Figure 2A:
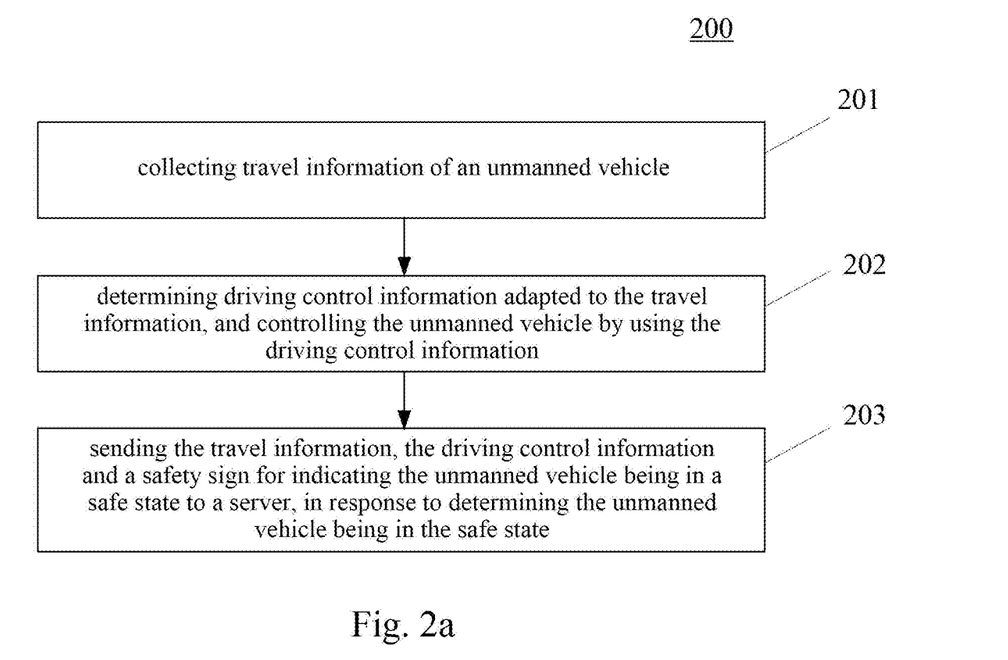
FIG. 2a is a flowchart of an embodiment of an information sharing method applicable to an unmanned vehicle according to the present disclosure.

With reference to FIG. 2a, a flow 200 of an embodiment of an information sharing method applicable to an unmanned vehicle according to the present disclosure is illustrated. The information sharing method applicable to an unmanned vehicle provided by the present embodiment of the present disclosure is executed by the unmanned vehicle 101 in FIG. 1. Accordingly, the information sharing method applicable to an unmanned vehicle is provided in the unmanned vehicle 101. The information sharing method applicable to an unmanned vehicle includes the following steps:

Step 201 includes collecting travel information of an unmanned vehicle.

In the present embodiment, the electronic device (e.g., the unmanned vehicle as shown in FIG. 1) on which the information sharing method applicable to an unmanned vehicle operates may collect travel information of an unmanned vehicle through a sensor deployed inside or outside the vehicle in the unmanned vehicle. Here, the travel information is used to indicate the travel state of the unmanned vehicle.

In some alternative implementations of the present embodiment, the travel state may be the external state of the unmanned vehicle, for example, the environment in which the unmanned vehicle is located. Here, the environment in which the unmanned vehicle is located may be the weather environment, the road-related environment, etc.

In some alternative implementations of the present embodiment, the travel state may be the internal state of the unmanned vehicle, for example, the driving speed of the unmanned vehicle, the oil mass, etc.

In some alternative implementations of the present embodiment, the travel information may include but is not limited to at least one of the following: driving environment information, driving speed information.

In some alternative implementations of the present embodiment, the driving environment information may include but is not limited to at least one of the following: weather information, road information, traffic information, information of distance between vehicles, information of number of nearby vehicles and visibility information. Here, the weather information may indicate types of the weather, such as rain, snow, sunny and the like. The road information may indicate types of the roads, such as highways, national roads, mountain roads and the like. The traffic information may indicate the congestion condition of the road, such as congested, normal, smooth and the like, and the traffic information may be determined by the traveled distance of the unmanned vehicle within a predetermined period of time. The information of distance between vehicles may indicate the distance between the unmanned vehicle and a vehicle in front and/or a vehicle behind. The information of number of nearby vehicles may indicate the number of other vehicles within a predetermined distance range from the unmanned vehicle. The visibility information may indicate the visibility of the driving environment.

Step 202 includes determining driving control information adapted to the travel information, and controlling the unmanned vehicle by utilizing the driving control information.

In the present embodiment, the electronic device (e.g., the unmanned vehicle as shown in FIG. 1) on which the information sharing method applicable to an unmanned vehicle operate may first determine driving control information adapted to the travel information, and control the unmanned vehicle by utilizing the driving control information.

In the present embodiment, the driving control information may be information for controlling the driving of the unmanned vehicle. For example, the driving control information may include, but is not limited to, control acceleration information, control deceleration information, control starting information, control braking information and control turning information. It may be understood that the control acceleration information is used to control the unmanned vehicle to accelerate, the control deceleration information is used to control the unmanned vehicle to decelerate, the control starting information is used to control the unmanned vehicle to start, the control braking information is used to control the unmanned vehicle to brake, and the control turning information is used to control the unmanned vehicle to turn.

In some alternative implementations of the present embodiment, the step 202 may be implemented as follow: acquiring driving control information tolerated by the pre-stored driving control information as driving control information adapted to the travel information.

In some alternative implementations of the present embodiment, the step 202 may be implemented as follow: converting the driving mode of the unmanned vehicle to manual mode so that the unmanned vehicle is controlled by the driver, collecting, by the unmanned vehicle, the driving control information of the unmanned vehicle when the unmanned vehicle is controlled by the driver, as the driving control information adapted to the travel information.

In some alternative implementations of the present embodiment, the step 202 may be implemented as follow: finding travel information matching the collected travel information, from a pre-established driving control information comparison table, the driving control information comparison table being used to characterize a corresponding relation between travel information and driving control information; acquiring driving control information corresponding to the found travel information; adjusting the acquired driving control information and determining driving control information adapted to the collected travel information, in response to determining the collected travel information being different from the found travel information.

In some alternative implementations of the present embodiment, the driving control information comparison table may be pre-stored in the unmanned vehicle locally, or also may be stored in the server providing support to the unmanned vehicle.

For example, the collected travel information is road information, and the collected road information indicates that the unmanned vehicle is traveling on the highway. The road information matching the collected road information is found from the pre-established driving control information comparison table. It may be understood that when the road information indicating the highway does not exist in the pre-established driving control information comparison table, the road information indicating the national highway is found out as the travel information matching the collected travel information. In the driving control information comparison table, the driving control information corresponding to the road information indicating the national highway is the control acceleration information. For example, when the control acceleration information is "accelerating at an acceleration of 30 m/s$^2$", the acquired driving control information is adjusted, such as, the acceleration in the "accelerating at an acceleration of 30 m/s$^2$" may be randomly adjusted to faster or slower. Or, the "accelerating at an acceleration of 30 m/s$^2$" may be adjusted to "accelerating at an acceleration of 40 m/s$^2$", based on a pre-acquired experience that the driving speed of the unmanned vehicle on the highway is greater than the driving speed of the unmanned vehicle on the national highway.

It may be understood that "m" in the present disclosure is the length unit "meter", "m/s$^2$" is the acceleration unit "meter/second$^2$", and "km/h" is the speed unit "kilometers/hour".

Step 203 includes sending the travel information, the driving control information and a safety sign for indicating the unmanned vehicle being in a safe state to a server, in response to determining the unmanned vehicle being in the safe state.

In the present embodiment, the electronic device (e.g., the unmanned vehicle as shown in FIG. 1) on which the information sharing method applicable to an unmanned vehicle operate may determine whether the unmanned vehicle is in a safe state, and send the travel information, the driving control information and a safety sign to the server, in response to determining that the unmanned vehicle is in the safe state, to enable the server to push the travel information, the driving control information and the safety sign to an unmanned vehicle in the travel state indicated by the travel information. Here, the safety sign is used to indicate that the unmanned vehicle is in the safe state.

In the present embodiment, what kind of state is a safe state may be pre-defined. For example, the safe state may be defined based on parameters such as speed, oil mass and distance to a vehicle in front and/or behind.

In some alternative implementations of the present embodiment, the safe state may be defined as a state in which the distances between the unmanned vehicle and the vehicle in front and the vehicle behind are both greater than a predetermined vehicle distance threshold.

In some alternative implementations of the present embodiment, the definition of the safe state may be associated with the travel information. For example, for the unmanned vehicle travelling on the highway, the safe state may be defined as a state in which the speed of the unmanned vehicle is greater than 60 km/h and less than 120 km/h.

In some alternative implementations of the present embodiment, the safe state may be defined based on various parameters. In response to determining that the various parameters of the unmanned vehicle meet all of the definitions of the safe state within a predetermined period of time, the unmanned vehicle is determined to be in the safe state.

Typically, when an unmanned vehicle A travels in the travel state indicated by the collected travel information, with certain driving control information being determined and applied, and the unmanned vehicle A is determined to be in the safe state controlled by the applied driving control information, the unmanned vehicle A sends the collected travel information, the determined driving control information and the safety sign to the server. The server pushes the travel information, the determined driving control information and the safety sign to an unmanned vehicle in the travel state indicated by the travel information. It may be understood that the unmanned vehicle receiving the pushed information may include the unmanned vehicle A, and may also include unmanned vehicles other than the unmanned vehicle A, such as an unmanned vehicle B. The unmanned vehicle B may store the received travel information, the driving control information and the safety sign associated with each other. The unmanned vehicle B may be controlled by the driving control information stored in association with the safety sign, when it is in the travel state indicated by the received travel information at present or afterwards.

In some alternative implementations of the present embodiment, the electronic device may also determine whether the unmanned vehicle is in a dangerous state, and send the travel information, the driving control information and a danger sign to the server, in response to the unmanned vehicle being in the dangerous state, to enable the server to push the travel information, the driving control information and the danger sign to an unmanned vehicle in the travel state indicated by the travel information. Here, the danger sign is used to indicate that the unmanned vehicle is in the dangerous state.

In the present embodiment, what kind of state is a dangerous state may be pre-defined. For example, the dangerous state may be defined based on parameters such as speed, oil mass, distance to a vehicle in front and/or behind.

In some alternative implementations of the present embodiment, the dangerous state may be defined as a state in which the distances between the unmanned vehicle and the vehicle in front and the vehicle behind are both less than a predetermined vehicle distance threshold.

In some alternative implementations of the present embodiment, the definition of the dangerous state may be associated with the travel information. For example, for the unmanned vehicle travelling on the highway, the dangerous state may be defined as a state in which the speed of the unmanned vehicle is less than 30 km/h or greater than 150 km/h.

For example, when an unmanned vehicle A travels in the travel state indicated by the collected travel information, with the driving control information being determined and applied, and the unmanned vehicle A may be in the dangerous state controlled by the applied driving control information. The unmanned vehicle A sends the collected travel information, the determined driving control information and the danger sign to the server. The server pushes the travel information, the determined driving control information and the danger sign to an unmanned vehicle in the travel state indicated by the travel information. It may be understood that the unmanned vehicle receiving the pushed information may include the unmanned vehicle A, and may also include unmanned vehicles other than the unmanned vehicle A, such as an unmanned vehicle B. The unmanned vehicle B may store the received travel information, the driving control information and the danger sign associated with each other. The unmanned vehicle B may forbid the controlling by the driving control information stored in association with the danger sign, when it is in the travel state indicated by the received travel information at present or afterwards.

Figure 2B:
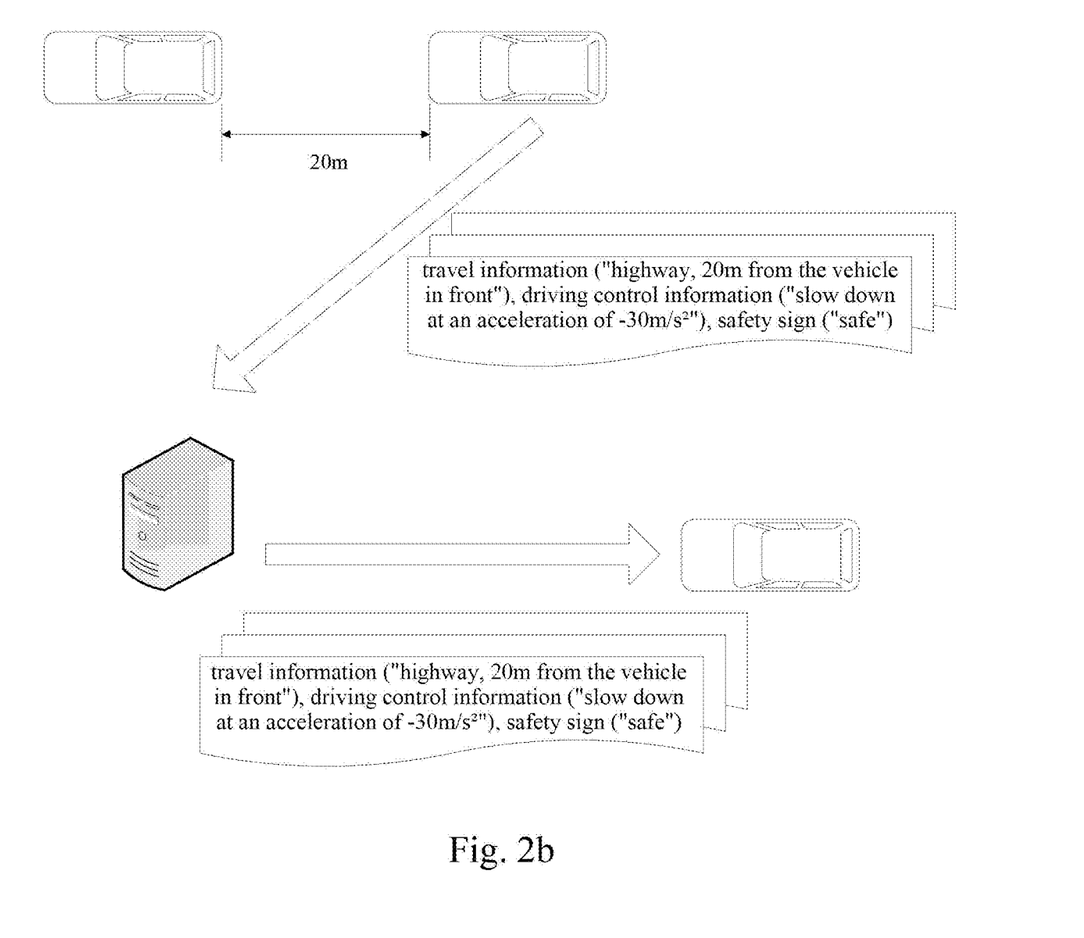
FIG. 2b is a schematic diagram of an application scenario of the information sharing method applicable to an unmanned vehicle according to the present disclosure.

As shown in FIG. 2b, an application scenario of the method provided by the present embodiment is illustrated. First, the unmanned vehicle collects travel information, for example, the collected travel information is "highway, 20 m from the vehicle in front". Then, the unmanned vehicle determines the driving control information adapted to the travel information, for example, the determined driving control information is "slow down at an acceleration of −30 m/s$^2$". Finally, the unmanned vehicle sends the travel information ("highway, 20 m from the vehicle in front"), the driving control information ("slowdown at an acceleration of −30 m/s$^2$") and the safety sign ("safe") to the server, in response to determining that the unmanned vehicle is in the safe state. The server pushes the travel information ("highway, 20 m from the vehicle in front"), the driving control information ("slow down at an acceleration of −30 m/s$^2$") and the safety sign ("safe") to an unmanned vehicle in the travel state indicated by the travel information. The unmanned vehicle which received the travel information ("highway, 20 m from the vehicle in front"), the driving control information ("slow down at an acceleration of −30 m/s$^2$") and the safety sign ("safe") may refer to or adopt the driving control information ("slowdown at an acceleration of −30 m/s$^2$") to control the vehicle.

The method provided by the above embodiment of the present disclosure, by collecting travel information of an unmanned vehicle, determining driving control information adapted to the travel information and controlling the unmanned vehicle by utilizing the driving control information, and sending the travel information, the driving control information and a safety sign for indicating the unmanned vehicle being in a safe state to a server, in response to determining the unmanned vehicle being in the safe state, can achieve an information sharing between unmanned vehicles and improve the driving control efficiency of the unmanned vehicle.

Figure 3:
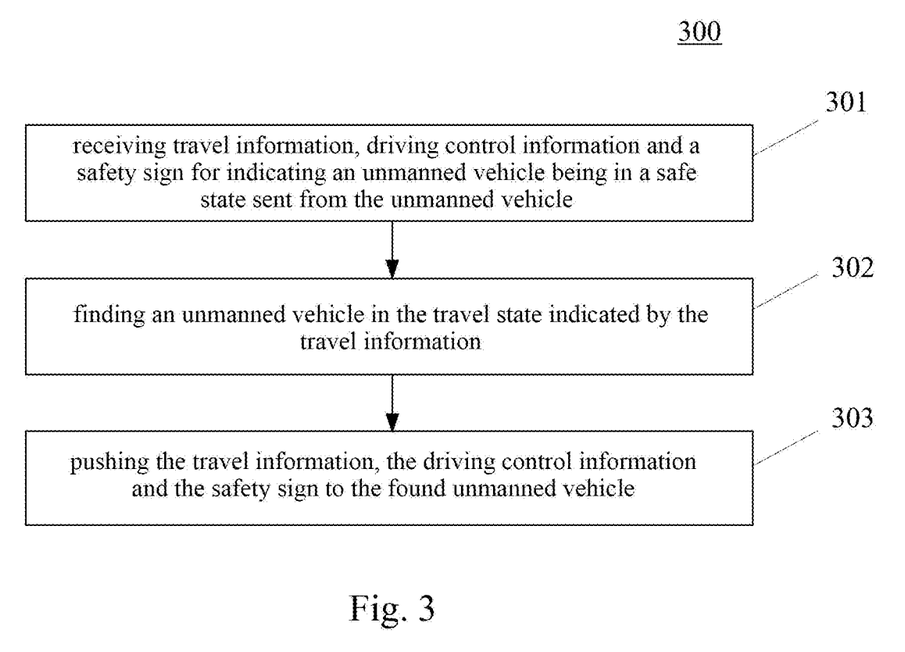
FIG. 3 is a flowchart of an embodiment of another information sharing method applicable to an unmanned vehicle according to the present disclosure.

With further reference to FIG. 3, a flow 300 of an embodiment of another information sharing method applicable to an unmanned vehicle is illustrated. The information sharing method applicable to an unmanned vehicle provided by the present embodiment of the present disclosure is executed by the server 102 in FIG. 1. Accordingly, the information sharing method applicable to an unmanned vehicle is provided in the server 102. The flow 300 of the information sharing method applicable to an unmanned vehicle includes the following steps:

Step 301 includes receiving travel information, driving control information and a safety sign for indicating an unmanned vehicle being in a safe state sent by the unmanned vehicle.

In the present embodiment, the electronic device (e.g., the server as shown in FIG. 1) on which the information sharing method applicable to an unmanned vehicle operate may receive travel information, driving control information and a safety sign for indicating an unmanned vehicle being in a safe state sent by the unmanned vehicle. Here, the travel information is used to indicate the travel state of the unmanned vehicle.

In some alternative implementations of the present embodiment, the travel information may include but is not limited to at least one of the following: driving environment information, driving speed information.

In the present embodiment, the travel information, the driving control information and the safety sign are sent by the unmanned vehicle, by collecting the travel information of the unmanned vehicle, determining the driving control information adapted to the travel information and controlling the unmanned vehicle by utilizing the driving control information, in response to the unmanned vehicle being in the safe state.

In some alternative implementations of the present embodiment, the electronic device may also receive travel information, driving control information and a danger sign sent by the unmanned vehicle. Here, the danger sign is used to indicate that the unmanned vehicle is in a dangerous state. Here, the travel information and the driving control information received together with the danger sign are sent by the unmanned vehicle, in response to the unmanned vehicle being in the dangerous state.

Step 302 includes finding an unmanned vehicle in the travel state indicated by the travel information.

In the present embodiment, the electronic device may find an unmanned vehicle in the travel state indicated by the travel information.

In some alternative implementations of the present embodiment, the electronic device may also find an unmanned vehicle in the travel state indicated by the travel information received together with the danger sign.

Step 303 includes pushing the travel information, the driving control information and the safety sign to the found unmanned vehicle.

In the present embodiment, the electronic device may push the travel information, the driving control information and the safety sign to the found unmanned vehicle.

In some alternative implementations of the present embodiment, the electronic device may also push the travel information, the driving control information and the danger sign received together with the danger sign to the unmanned vehicle in the travel state indicated by the travel information received together with the danger sign.

In some alternative implementations of the present embodiment, the travel information also includes a region sign for indicating a region in which the unmanned vehicle is located, and the electronic device may further: push the received travel information and the driving control information to an unmanned vehicle located in the region indicated by the region sign.

In some alternative implementations of the present embodiment, the region in which the unmanned vehicle is located may be the province, city or county in which the unmanned vehicle is located. The region in which the unmanned vehicle is located may be the road or highway in which the unmanned vehicle is located, for example, the region in which the unmanned vehicle is located may be the 107 national highway in which the unmanned vehicle is located.

For example, an unmanned vehicle A sends travel information, driving control information, a safety sign or a danger sign to the server, wherein the travel information includes driving environment information and a region sign, for example, the region sign may be "Beijing". The server may sort and store the travel information and the driving control information according to the region sign. The server may push the received travel information, the driving control information, the safety sign or the danger sign to an unmanned vehicle located in the region indicated by the above region sign, for example, the server may push the received travel information, the driving control Information, the safety sign or the danger sign to unmanned vehicles traveling in the city of Beijing.

In some alternative implementations of the present embodiment, the electronic device may further: determine whether there is travel information identical to the received travel information in pre-stored travel information; determine whether the control effect sign of the received travel information is identical to the control effect sign of the stored travel information, in response to determining that there is travel information identical to the received travel information, the control effect sign of the travel information referring to a safety sign or a danger sign received together with the travel information; and replace the driving control information corresponding to the pre-stored travel information identical to the received travel information with the received driving control information, in response to determining that the control effect sign of the received travel information is identical to the control effect sign of the stored travel information.

It may be understood that the travel information sent by the unmanned vehicle to the server may have been pre-stored by the server. For example, the travel information sent by the unmanned vehicle is "highway, 20 m from the vehicle in front", the driving control information is "slow down at an acceleration of −30 m/s" and the control effect sign is "safe". The travel information "highway, 20 m from the vehicle in front" may already exist in the travel information pre-stored by the server. In response to determining that the travel information "highway, 20 m from the vehicle in front" being identical to the received travel information "highway, 20 m from the vehicle in front" already exists in the travel information pre-stored by the server, determining whether the control effect sign of the received travel information is identical to the control effect sign of the pre-stored travel information, that is, determining whether the control effect sign of the "highway, 20 m from the vehicle in front" is also "safe" in the pre-stored travel information. In response to determining that the control effect sign of the "highway, 20 m from the vehicle in front" is also "safe" in the pre-stored travel information, replacing the driving control information (e.g., "slow down at an acceleration of −20 m/s") corresponding to the pre-stored travel information with the received driving control information "slow down at an acceleration of −30 m/s".

It may be understood that the driving control information stored in the server may be timely updated by replacing the driving control information stored in the server with the latest driving control information. When the unmanned vehicle is able to request the driving control information from the server, the server may return time-efficient driving control parameters to the unmanned vehicle to improve the control efficiency of the unmanned vehicle.

In some alternative implementations of the present embodiment, the electronic device may further: determine driving control range information corresponding to the received travel information, in response to determining that the control effect sign of the received travel information is identical to the control effect sign of the stored travel information, based on the received driving control information and the driving control information corresponding to the pre-stored travel information identical to the received travel information, wherein the driving control range information is used to indicate the range of the driving control information; and send the determined driving control range information to an unmanned vehicle in the travel state indicated by the received travel information.

For example, the travel information sent by the unmanned vehicle is "highway, 20 m from the vehicle in front", the driving control information is "slow down at an acceleration of −30 m/s" and the control effect sign is "safe". The pre-stored travel information by the server is "highway, 20 m from the vehicle in front", the driving control information is "slow down at an acceleration of −20 m/s" and the control effect sign is "safe". The server may determine the driving control range information to be "slow down at an acceleration of equal to or less than −20 m/s and greater or equal to −30 m/s". The server may send the driving control range information "slow down at an acceleration of equal to or less than −20 m/s and greater or equal to −30 m/s" to the unmanned vehicle, to enable the unmanned vehicle to refer that in the travel state "highway, 20 m from the vehicle in front", "slow down at an acceleration of equal to or less than −20 m/s and greater or equal to −30 m/s" is "safe".

The corresponding description to each step in the present embodiment may refer to the corresponding embodiment in FIG. 2a, and detailed description thereof will be omitted.

The method provided by the present embodiment, by receiving travel information, driving control information and a safety sign for indicating an unmanned vehicle being in a safe state sent by the unmanned vehicle, finding an unmanned vehicle in the travel state indicated by the travel information, and pushing the travel information, the driving control information and the safety sign to the found unmanned vehicle, can achieve an information sharing between unmanned vehicles and improve the driving control efficiency of the unmanned vehicle.

Figure 4:
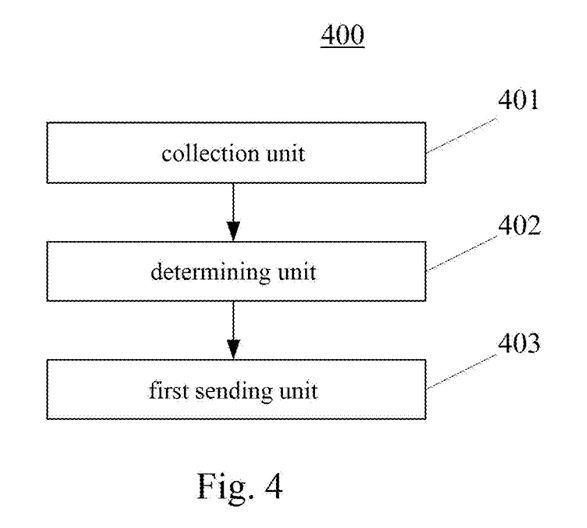
FIG. 4 is a schematic structural diagram of an embodiment of an information sharing apparatus applicable to an unmanned vehicle according to the present disclosure.

With further reference to FIG. 4, as an implementation to the method illustrated in the FIG. 2a, the present disclosure provides an embodiment of an information sharing apparatus applicable to an unmanned vehicle. The apparatus embodiment corresponds to the method embodiment shown in FIG. 2a, and the apparatus may be specifically applied to various electronic devices.

As shown in FIG. 4, the information sharing apparatus 400 applicable to an unmanned vehicle illustrated by the present embodiment includes: a collection unit 401, a determining unit 402 and a first sending unit 403. The collection unit 401 is configured to collect travel information of an unmanned vehicle, the travel information being used to indicate a travel state of the unmanned vehicle. The determining unit 402 is configured to determine driving control information adapted to the travel information, and control the unmanned vehicle by utilizing the driving control information. The first sending unit 403 is configured to send the travel information, the driving control information and a safety sign for indicating the unmanned vehicle being in a safe state to a server, in response to determining the unmanned vehicle being in the safe state, to enable the server to push the travel information, the driving control information and the safety sign to an unmanned vehicle in the travel state indicated by the travel information.

In the present embodiment, the collection unit 401 of the information sharing apparatus 400 applicable to an unmanned vehicle may collect travel information of the unmanned vehicle through a sensor deployed inside or outside the vehicle on the unmanned vehicle. Here, the travel information is used to indicate the travel state of the unmanned vehicle.

In the present embodiment, the determining unit 402 of the information sharing apparatus 400 applicable to an unmanned vehicle may first determine driving control information adapted to the travel information, and control the unmanned vehicle by utilizing the driving control information.

In the present embodiment, the first sending unit 403 of the information sharing apparatus 400 applicable to an unmanned vehicle may determine whether the unmanned vehicle is in a safe state, and send the travel information, the driving control information and a safety sign to the server, in response to determining that the unmanned vehicle is in the safe state, to enable the server to push the travel information, the driving control information and the safety sign to an unmanned vehicle in the travel state indicated by the travel information. Here, the safety sign is used to indicate that the unmanned vehicle is in the safe state.

In some alternative implementations of the present embodiment, the apparatus further includes: a second sending unit (not shown), configured to send the travel information, the driving control information and a danger sign for indicating the unmanned vehicle being in a dangerous state to the server, in response to the unmanned vehicle being in the dangerous state, to enable the server to push the travel information, the driving control information and the danger sign to an unmanned vehicle in the travel state indicated by the travel information.

In some alternative implementations of the present embodiment, the determining unit is further configured to: find travel information matching the collected travel information, from a pre-established driving control information comparison table, the driving control information comparison table being used to characterize a corresponding relation between travel information and driving control information; acquire driving control information corresponding to the found travel information; adjust the acquired driving control information and determining driving control information adapted to the collected travel information, in response to determining the collected travel information being different from the found travel information.

The implementation details and technical effects of the units of the apparatus provided by the present embodiment may refer to the descriptions in the other embodiments of the present embodiment (in particular the corresponding embodiment in FIG. 2a), and detailed description thereof will be omitted.

Figure 5:
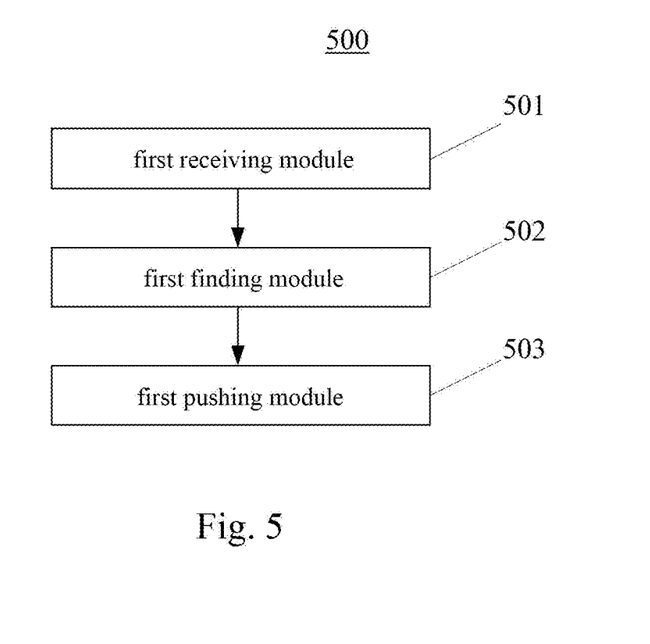
FIG. 5 is a schematic structural diagram of an embodiment of another information sharing apparatus applicable to an unmanned vehicle according to the present disclosure.

With further reference to FIG. 5, as an implementation to the method illustrated in the FIG. 3, the present disclosure provides an embodiment of an information sharing apparatus applicable to an unmanned vehicle. The apparatus embodiment corresponds to the method embodiment shown in FIG. 3, and the apparatus may be specifically applied to various electronic devices.

As shown in FIG. 5, the information sharing apparatus 500 applicable to an unmanned vehicle illustrated by the present embodiment includes: a first receiving module 501, a first finding module 502 and a first pushing module 503. The first receiving module is configured to receive travel information, driving control information and a safety sign for indicating an unmanned vehicle being in a safe state sent by the unmanned vehicle, the travel information being used to indicate the travel state of the unmanned vehicle, the travel information, the driving control information and the safety sign being sent by the unmanned vehicle by collecting the travel information of the unmanned vehicle, determining the driving control information adapted to the travel information, and controlling the unmanned vehicle by utilizing the driving control information, in response to determining the unmanned vehicle being in the safe state. The first finding module is configured to find an unmanned vehicle in the travel state indicated by the travel information. The first pushing module is configured to push the travel information, the driving control information and the safety sign to the found unmanned vehicle.

In the present embodiment, the receiving unit 501 of the information sharing apparatus 500 applicable to an unmanned vehicle may receive travel information, driving control information and a safety sign for indicating an unmanned vehicle being in a safe state sent by the unmanned vehicle. Here, the travel information is used to indicate the travel state of the unmanned vehicle, and the travel information includes at least one of the following: driving environment information, driving speed information.

In the present embodiment, the first finding module 502 of the information sharing apparatus 500 applicable to an unmanned vehicle may find an unmanned vehicle in the travel state indicated by the travel information.

In the present embodiment, the first pushing module 503 of the information sharing apparatus 500 applicable to an unmanned vehicle may push the travel information, the driving control information and the safety sign to the found unmanned vehicle.

In some alternative implementations of the present embodiment, the apparatus further includes: a second receiving module (not shown), configured to receive travel information, driving control information and a danger sign for indicating an unmanned vehicle being in a dangerous state sent by the unmanned vehicle, the travel information and the driving control information received together with the danger sign being sent by the unmanned vehicle, in response to determining the unmanned vehicle being in the dangerous state; a second finding module (not shown), configured to find an unmanned vehicle in the travel state indicated by the travel information received together with the danger sign; and a second pushing module (not shown), configured to push the danger sign, the travel information and the driving control information received together with the danger sign, to the unmanned vehicle in the travel state indicated by the travel information received together with the danger sign.

In some alternative implementations of the present embodiment, the travel information includes a region sign for indicating a region in which the unmanned vehicle is located, and the apparatus further includes: a third pushing module (not shown), configured to push the received travel information and the driving control information to an unmanned vehicle located in the region indicated by the region sign.

In some alternative implementations of the present embodiment, the apparatus further includes: a first determining module (not shown), configured to determine whether there is travel information identical to the received travel information in pre-stored travel information; a second determining module (not shown), configured to determine whether a control effect sign of the received travel information is identical to a control effect sign of the stored travel information, in response to determining that there is travel information identical to the received information, the control effect sign of the travel information referring to a safety sign or a danger sign received together with the travel information; and a replacing module (not shown), configured to replace driving control information corresponding to the pre-stored travel information identical to the received travel information with the received driving control information, in response to determining the control effect sign of the received travel information being identical to the control effect sign of the stored travel information.

In some alternative implementations of the present embodiment, the apparatus further includes: a third determining module (not shown), configured to determine driving control range information corresponding to the received travel information, in response to determining the control effect sign of the received travel information being identical to the control effect sign of the stored travel information, based on the received driving control information and the driving control information corresponding to the pre-stored travel information identical to the received travel information, the driving control range information being used to indicate a range of the driving control information; and a sending module (not shown), configured to send the determined driving control range information to an unmanned vehicle in the travel state indicated by the received travel information.

The implementation details and technical effects of the units of the apparatus provided by the present embodiment may refer to the descriptions in the other embodiments of the present embodiment (in particular the corresponding embodiment in FIG. 3), and detailed description thereof will be omitted.

The present disclosure provides an embodiment of an information sharing system applicable to an unmanned vehicle. The present embodiment of the information sharing system applicable to an unmanned vehicle includes: an apparatus provided by the corresponding embodiment in FIG. 4 and an apparatus provided by the corresponding embodiment in FIG. 5.

Figure 6:
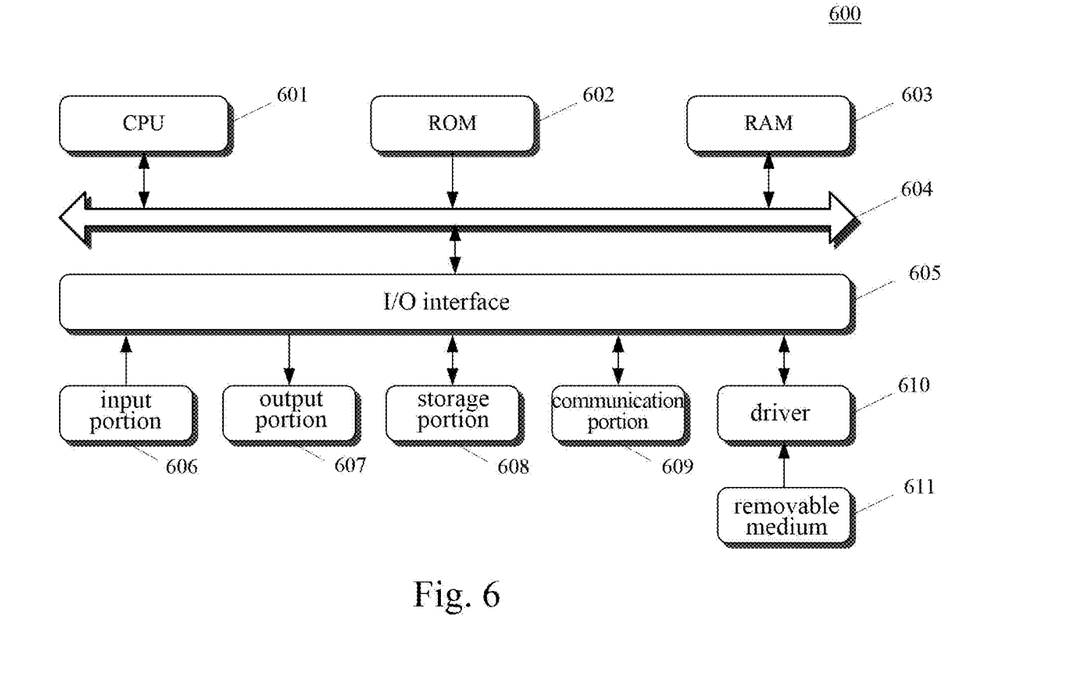
FIG. 6 is a schematic structural diagram of a computer system adapted to implement an electronic device of embodiments of the present disclosure.

With reference to FIG. 6, a schematic structural diagram of a computer system 600 of an electronic device adapted to implement the embodiments of the present disclosure is illustrated. The electronic device shown in FIG. 6 is merely an example and should not impose any restriction on the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker, etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the CPU 601, implements the functions as defined by the methods of the present disclosure.

It is to be noted that the computer readable medium in the present application may be computer readable signal medium or computer readable storage medium or the combination thereof. An example of the computer readable storage medium may include but not limited to: systems, devices or elements of electric, magnet, light, electromagnet, infrared ray, or semiconductor or the combination thereof. A more specific example of the computer readable storage medium may include but not limited to: electrical connections with one or more wires, portable computer disk, hard disk, random access memory (RAM), read only memory (ROM), erasable programmable read only memory (EPROM or flash memory), fibre, portable compact disk read only memory (CD-ROM), optical memory, magnet memory or the combination thereof. In the present application, the computer readable storage medium may be any physical medium containing or storing programs which can be used by a command execution system, a device or an elements or the incorporation thereof. In the present application, the computer readable signal medium may include data signal in the base band or propagating as parts of a carrier in which computer readable program codes are carried. A form of the propagated signal may include but not limited to: electromagnetic signal, optical signal or the combination thereof. The signal medium that can be read by computer may be any computer readable medium except for computer readable storage medium. The computer readable medium is capable of emitting, propagating or transmitting programs for an instruction execution system, a device or an element or the combination thereof. The program codes on the computer readable medium may be transported with any suitable medium including but not limited to: a wireless medium, a wire medium, an optical cable medium, a RF medium or any combination thereof.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a collection unit, a determining unit and a first sending unit, where the names of these units or modules do not in some cases constitute a limitation to such units or modules themselves. For example, the collection unit may also be described as "a unit for collecting travel information of an unmanned vehicle."

The units or modules involved in the embodiments of the present application may be implemented by means of software or hardware. The described units or modules may also be provided in a processor, for example, described as: a processor, comprising a first receiving module, a first finding module and a first pushing module, where the names of these units or modules do not in some cases constitute a limitation to such units or modules themselves. For example, the first receiving module may also be described as "a module for receiving travel information, driving control information and a safety sign for indicating an unmanned vehicle being in a safe state sent from the unmanned vehicle."

In another aspect, the present application further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: collect travel information of an unmanned vehicle, the travel information being configured to indicate a travel state of the unmanned vehicle; determine driving control information adapted to the travel information, and control the unmanned vehicle by using the driving control information; and send the travel information, the driving control information and a safety sign for indicating the unmanned vehicle being in a safe state to a server, in response to determining the unmanned vehicle being in the safe state, to enable the server to push the travel information, the driving control information and the safety sign to an unmanned vehicle in the travel state indicated by the travel information.

In another aspect, the present application further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: receive travel information, driving control information and a safety sign for indicating an unmanned vehicle being in a safe state sent from the unmanned vehicle, the travel information being configured to indicate a travel state of the unmanned vehicle, and the travel information, the driving control information and the safety sign being sent from the unmanned vehicle by collecting the travel information of the unmanned vehicle, determining the driving control information adapted to the travel information, and controlling the unmanned vehicle by utilizing the driving control information, in response to determining the unmanned vehicle being in the safe state; find an unmanned vehicle in the travel state indicated by the travel information; and push the travel information, the driving control information and the safety sign to the found unmanned vehicle.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. An information sharing method applicable to an unmanned vehicle, comprising:
    collecting travel information of the unmanned vehicle, the travel information being configured to indicate a travel state of the unmanned vehicle;
    determining driving control information adapted to the travel information, and controlling the unmanned vehicle by using the driving control information; and
    sending the travel information, the driving control information and a safety sign for indicating the unmanned vehicle being in a safe state to a server, in response to determining the unmanned vehicle being in the safe state, the safe state being defined based on a parameter associated with the unmanned vehicle satisfying a criterion while the unmanned vehicle is being controlled by using the driving control information, to enable the server to push the travel information, the driving control information and the safety sign to second unmanned vehicle in the travel state indicated by the travel information.

2. The method according to claim 1, further comprising:
    sending the travel information, the driving control information and a danger sign for indicating the unmanned vehicle being in a dangerous state to the server, in response to the unmanned vehicle being in the dangerous state, the dangerous state being defined based on the parameter or an other parameter not satisfying the criterion or an other criterion, to enable the server to push the travel information, the driving control information and the danger sign to the second unmanned vehicle in the travel state indicated by the travel information.

3. The method according to claim 1, wherein the determining driving control information adapted to the travel information comprises:
    finding travel information matching the collected travel information, from a pre-established driving control information comparison table, the driving control information comparison table being configured to characterize a corresponding relation between the found travel information and the driving control information;
    acquiring driving control information corresponding to the found travel information; and
    adjusting the acquired driving control information and determining the driving control information adapted to the collected travel information, in response to determining the collected travel information being different from the found travel information.

4. The method according to claim 1, wherein the parameter includes a speed of the unmanned vehicle, or an oil mass of the unmanned vehicle, or a distance of the unmanned vehicle relative to the second unmanned vehicle, or wherein the criterion includes a predetermined threshold.

5. An information sharing method applicable to an unmanned vehicle, comprising:
    receiving, from the unmanned vehicle, travel information, driving control information and a safety sign for indicating the unmanned vehicle being in a safe state, the safe state being defined based on a parameter associated with the unmanned vehicle satisfying a criterion while the unmanned vehicle is being controlled by using the driving control information, wherein the travel information is configured to indicate a travel state of the unmanned vehicle, wherein the travel information, the driving control information and the safety sign are sent from the unmanned vehicle in response to determining the unmanned vehicle being in the safe state, after the unmanned vehicle collects the travel information of the unmanned vehicle, determines the driving control information adapted to the travel information, and controls the unmanned vehicle by utilizing the driving control information;
    finding a second unmanned vehicle in the travel state indicated by the travel information; and
    pushing the travel information, the driving control information and the safety sign to the second unmanned vehicle.

6. The method according to claim 5, further comprising:
    receiving, from the unmanned vehicle, the travel information, the driving control information and a danger sign for indicating the unmanned vehicle being in a dangerous state, the travel information and the driving control information received together with the danger sign being sent from the unmanned vehicle, in response to determining the unmanned vehicle being in the dangerous state, the dangerous state being defined based on the parameter or an other parameter not satisfying the criterion or an other criterion;
    finding the second unmanned vehicle in the travel state indicated by the travel information received together with the danger sign; and
    pushing the danger sign, the travel information and the driving control information received together with the danger sign, to the second unmanned vehicle in the travel state indicated by the travel information received together with the danger sign.

7. The method according to claim 5, wherein the travel information comprises a region sign for indicating a region in which the unmanned vehicle is located; and the method further comprises:
    pushing the received travel information and the driving control information to the second unmanned vehicle located in the region indicated by the region sign.

8. The method according to claim 7, further comprising:
    determining whether there is travel information identical to the received travel information in pre-stored travel information;
    determining whether a control effect sign of the received travel information is identical to a control effect sign of the pre-stored travel information, in response to determining there is the travel information identical to the received travel information, the control effect sign of the travel information referring to the safety sign or a danger sign received together with the travel information; and
    replacing driving control information corresponding to the pre-stored travel information identical to the received travel information with the received driving control information, in response to determining the control effect sign of the received travel information being identical to the control effect sign of the pre-stored travel information.

9. The method according to claim 8, further comprising:
    determining driving control range information corresponding to the received travel information, in response to determining the control effect sign of the received travel information being identical to the control effect sign of the pre-stored travel information, based on the received driving control information and the driving control information corresponding to the pre-stored travel information identical to the received travel information, the driving control range information being configured to indicate a range of the driving control information; and sending the determined driving control range information to the second unmanned vehicle in the travel state indicated by the received travel information.

10. An information sharing apparatus applicable to an unmanned vehicle, comprising:
   at least one processor; and
   a memory storing instructions, which when executed by the at least one processor, cause the at least one processor to perform operations, the operations comprising:
   collecting travel information of the unmanned vehicle, the travel information being configured to indicate a travel state of the unmanned vehicle;
   determining driving control information adapted to the travel information, and controlling the unmanned vehicle by using the driving control information; and
   sending the travel information, the driving control information and a safety sign for indicating the unmanned vehicle being in a safe state to a server, in response to determining the unmanned vehicle being in the safe state, to enable the server to push the travel information, the driving control information and the safety sign to second unmanned vehicle in the travel state indicated by the travel information, the safe state being defined based on a parameter associated with the unmanned vehicle satisfying a criterion while the unmanned vehicle is being controlled by using the driving control information.

11. The apparatus according to claim 10, wherein the operations further comprises:
   sending the travel information, the driving control information and a danger sign for indicating the unmanned vehicle being in a dangerous state to the server, in response to the unmanned vehicle being in the dangerous state, to enable the server to push the travel information, the driving control information and the danger sign to the second unmanned vehicle in the travel state indicated by the travel information, the dangerous state being defined based on the parameter or an other parameter not satisfying the criterion or an other criterion.

12. The apparatus according to claim 10, wherein the determining driving control information adapted to the travel information comprises:
   finding travel information matching the collected travel information, from a pre-established driving control information comparison table, the driving control information comparison table being configured to characterize a corresponding relation between the found travel information and the driving control information;
   acquiring driving control information corresponding to the found travel information; and
   adjusting the acquired driving control information and determining the driving control information adapted to the collected travel information, in response to determining the collected travel information being different from the found travel information.

13. An information sharing apparatus applicable to an unmanned vehicle, comprising:
   at least one processor; and
   a memory storing instructions, which when executed by the at least one processor, cause the at least one processor to perform operations, the operations comprising:
   receiving, from the unmanned vehicle, travel information, driving control information and a safety sign for indicating the unmanned vehicle being in a safe state, wherein the travel information is configured to indicate a travel state of the unmanned vehicle, wherein the travel information, the driving control information and the safety sign are sent from the unmanned vehicle in response to determining the unmanned vehicle being in the safe state, after the unmanned vehicle collects the travel information of the unmanned vehicle, determines the driving control information adapted to the travel information, and controls the unmanned vehicle by utilizing the driving control information, the safe state being defined based on a parameter associated with the unmanned vehicle satisfying a criterion while the unmanned vehicle is being controlled by using the driving control information;
   finding a second unmanned vehicle in the travel state indicated by the travel information; and
   pushing the travel information, the driving control information and the safety sign to the second unmanned vehicle.

14. The apparatus according to claim 13, wherein the operations further comprises:
   receiving, from the unmanned vehicle the travel information, the driving control information and a danger sign for indicating the unmanned vehicle being in a dangerous state, the travel information and the driving control information received together with the danger sign being sent from the unmanned vehicle, in response to determining the unmanned vehicle being in the dangerous state, the dangerous state being defined based on the parameter or an other parameter not satisfying the criterion or an other criterion;
   finding the second unmanned vehicle in the travel state indicated by the travel information received together with the danger sign; and pushing the danger sign, the travel information and the driving control information received together with the danger sign, to the second unmanned vehicle in the travel state indicated by the travel information received together with the danger sign.

15. The apparatus according to claim 13, wherein the travel information comprises a region sign for indicating a region in which the unmanned vehicle is located; and the operations further comprises:
   pushing the received travel information and the driving control information to the second unmanned vehicle located in the region indicated by the region sign.

16. The apparatus according to claim 15, wherein the operations further comprises:
   determining whether there is travel information identical to the received travel information in pre-stored travel information;
   determining whether a control effect sign of the received travel information is identical to a control effect sign of the pre-stored travel information, in response to determining there is the travel information identical to the received travel information, the control effect sign of the travel information referring to the safety sign or a danger sign received together with the travel information; and
   replacing driving control information corresponding to the pre-stored travel information identical to the received travel information with the received driving control information, in response to determining the control effect sign of the received travel information being identical to the control effect sign of the pre-stored travel information.

17. The apparatus according to claim 16, wherein the operations further comprises:
    determining driving control range information corresponding to the received travel information, in response to determining the control effect sign of the received travel information being identical to the control effect sign of the pre-stored travel information, based on the received driving control information and the driving control information corresponding to the pre-stored travel information identical to the received travel information, the driving control range information being configured to indicate a range of the driving control information; and
    sending the determined driving control range information to the other second unmanned vehicle in the travel state indicated by the received travel information.

18. An information sharing system applicable to an unmanned vehicle, comprising: a first information sharing apparatus applicable to the unmanned vehicle and a second information sharing apparatus applicable to the unmanned vehicle, wherein
    the first information sharing apparatus comprises:
    at least one first processor; and
    a first memory storing instructions, which when executed by the at least one first processor, cause the at least one first processor to perform first operations, the first operations comprising:
    collecting travel information of the unmanned vehicle, the travel information being configured to indicate a travel state of the unmanned vehicle;
    determining driving control information adapted to the travel information, and controlling the unmanned vehicle by using the driving control information; and
    sending the travel information, the driving control information and a safety sign for indicating the unmanned vehicle being in a safe state to a server, in response to determining the unmanned vehicle being in the safe state, to enable the server to push the travel information, the driving control information and the safety sign to second unmanned vehicle in the travel state indicated by the travel information, the safe state being defined based on a parameter associated with the unmanned vehicle satisfying a criterion while the unmanned vehicle is being controlled by using the driving control information;
    the second information sharing apparatus comprises:
    at least one second processor; and
    a second memory storing instructions, which when executed by the at least one second processor, cause the at least one second processor to perform second operations, the second operations comprising:
    receiving, from the unmanned vehicle the travel information, the driving control information and the safety sign for indicating the unmanned vehicle being in the safe state;
    finding the second unmanned vehicle in the travel state indicated by the travel information; and
    pushing the travel information, the driving control information and the safety sign to the second unmanned vehicle.

19. A non-transitory computer readable storage medium storing a computer program, which when executed by a processor, causes the processor to perform the method according to claim 1.

20. A non-transitory computer readable storage medium storing a computer program, which when executed by a processor, causes the processor to perform the method according to claim 5.

* * * * *

UNITED STATES PATENT AND TRADEMARK OFFICE
CERTIFICATE OF CORRECTION

PATENT NO. : 10,775,787 B2
APPLICATION NO. : 15/720882
DATED : September 15, 2020
INVENTOR(S) : Li et al.

Page 1 of 1

It is certified that error appears in the above-identified patent and that said Letters Patent is hereby corrected as shown below:

In the Claims

At Column 19, Line 32 (Claim 11, Line 2), please delete "further comprises" and insert --further comprise-- therefor.

At Column 20, Line 25 (Claim 14, Line 2), please delete "further comprises" and insert --further comprise-- therefor.

At Column 20, Line 52 (Claim 16, Line 2), please delete "further comprises" and insert --further comprise-- therefor.

At Column 21, Line 5 (Claim 17, Line 2), please delete "further comprises" and insert --further comprise-- therefor.

At Column 21, Line 18 (Claim 17, Line 15), please delete "to the other second unmanned vehicle" and insert --to the second unmanned vehicle-- therefor.

At Column 22, Line 7 (Claim 18, Line 24), please delete "to second unmanned vehicle" and insert --to a second unmanned vehicle-- therefor.

Signed and Sealed this
Twelfth Day of January, 2021

Andrei Iancu
*Director of the United States Patent and Trademark Office*